US010481969B2

(12) United States Patent
McGarvey et al.

(10) Patent No.: US 10,481,969 B2
(45) Date of Patent: Nov. 19, 2019

(54) CONFIGURABLE SYSTEM WIDE TESTS

(71) Applicant: Microsoft Technology Licensing, LLC, Redmond, WA (US)

(72) Inventors: Conal McGarvey, Seattle, WA (US); Jakob F. Lichtenberg, Redmond, WA (US); Andrew D. Mikesell, Kirkland, WA (US); Remy L. De Weduwe, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 141 days.

(21) Appl. No.: 15/640,272

(22) Filed: Jun. 30, 2017

(65) Prior Publication Data

US 2018/0225165 A1    Aug. 9, 2018

Related U.S. Application Data

(60) Provisional application No. 62/455,952, filed on Feb. 7, 2017.

(51) Int. Cl.
*G06F 11/263* (2006.01)
*G06F 11/07* (2006.01)

(52) U.S. Cl.
CPC ........ *G06F 11/079* (2013.01); *G06F 11/0721* (2013.01); *G06F 11/263* (2013.01)

(58) Field of Classification Search
CPC ....... G06F 11/079; G06F 11/263; G06F 11/36
USPC .................................. 714/37, 38.1
See application file for complete search history.

(56) References Cited

U.S. PATENT DOCUMENTS

| 6,002,869 | A | 12/1999 | Hinckley |
| 2004/0024868 | A1* | 2/2004 | Drummond, II ........ H04L 43/50 709/224 |
| 2004/0060044 | A1 | 3/2004 | Das et al. |
| 2005/0010842 | A1* | 1/2005 | Burke, Jr. ........ G01R 31/31907 714/724 |
| 2005/0086022 | A1 | 4/2005 | Lindberg et al. |
| 2006/0075303 | A1 | 4/2006 | Ulrich et al. |
| 2006/0150025 | A1 | 7/2006 | Hughes |
| 2011/0296383 | A1* | 12/2011 | Pasternak ........... G06F 11/3688 717/124 |
| 2013/0246853 | A1 | 9/2013 | Salame |
| 2015/0082107 | A1* | 3/2015 | Joy ........................ G06F 11/26 714/724 |

(Continued)

OTHER PUBLICATIONS

Srivastava, et al., "Efficient Integration Testing using Dependency Analysis", In Technical Report MSR-TR-2005-94, Jul. 2005, 9 pages.

(Continued)

*Primary Examiner* — Chae M Ko
(74) *Attorney, Agent, or Firm* — Newport IP, LLC; Han Gim

(57) ABSTRACT

Systems and methods to conduct data-driven, system wide tests are disclosed. Instructions for testing an operating system are associated with one or more modules associated with the computing system. When a failed test is identified, a second set of instructions that accounts for the failed test is generated and executed, in order to efficiently identify and target specific issues. Results from these fully configurable testing methods can be communicated and utilized in further applications.

20 Claims, 6 Drawing Sheets

(56) References Cited

U.S. PATENT DOCUMENTS

| | | | |
|---|---|---|---|
| 2015/0100832 A1* | 4/2015 | Nanjundappa | G06F 11/3688 |
| | | | 714/38.14 |
| 2016/0011959 A1* | 1/2016 | Li | G06F 11/3684 |
| | | | 714/38.1 |
| 2016/0196200 A1* | 7/2016 | Mizobuchi | G06F 11/3684 |
| | | | 717/124 |
| 2016/0350207 A1 | 12/2016 | Cmielowski et al. | |
| 2017/0322823 A1* | 11/2017 | Sethuramalingam | |
| | | | G06F 9/45533 |

OTHER PUBLICATIONS

Swift, et al., "Improving the Reliability of Commodity Operating Systems", in Proceedings of Nineteenth ACM Symposium on Operating Systems Principles, Oct. 19, 2003, pp. 207-222.

Qin, et al., "Rx: Treating Bugs As Allergies—A Safe Method to Survive Software Failures", In Proceedings of Twentieth ACM Symposium on Operating Systems Principles, Oct. 23, 2005, pp. 235-248.

\* cited by examiner

CONFIGURABLE SYSTEM WIDE TESTS

CROSS REFERENCE TO RELATED APPLICATIONS

This application claims benefit under 34 U.S.C. § 119(e) of Provisional U.S. patent application 62/455,952, filed Feb. 7, 2017, the contents of which are incorporated herein by reference in its entirety.

TECHNICAL FIELD

This disclosure generally relates to system wide integration testing of computer operating systems.

BACKGROUND

Computing devices and operating systems are configured to interact with peripheral devices. Software sometimes known as a device driver is typically used to operate and control each kind of device. In order to ensure integration and functionality between computing devices and components, processes for conducting system wide tests and validating components are performed.

These tests can be conducted systematically, through observing the system and determining how exhaustively each aspect of a driver's operation is covered. Information collected from these methods can be used to analyze overall system operations and performance. For example, using driver verifiers, peripheral devices can be tested by sending I/O data to the driver and determining whether or not the driver has failed. However, in many of the current testing methods, the testing process for a particular driver ends the first time a failure is reached. As a result, it can be difficult and/or impractical to identify failed drivers, bugs, and other issues in an efficient, timely manner, particularly when a large number of drivers are involved.

SUMMARY

Systems and methods to conduct data-driven, system wide tests are disclosed. In an embodiment, a set of instructions for testing an operating system is associated with one or more modules associated with the computing system. The instructions define the tests to be run on the system, how it will be executed, and how the one or more modules associated with the system will be analyzed. When the instructions are executed and a failed test is identified, the result is logged, and a second set of instructions is generated. These new instructions do not include the failed test, and may target additional and/or different system aspects, depending on the failed test, and as defined by the initial set of instructions. Then, the second set of instructions is executed and integration testing continues. The results of the failed tests, or any subset of tests, can be output, displayed, and sent to vendors or third parties, in order to further analyze particular aspects or modules of the system.

This process conducts integration tests such that a single failure does not terminate the testing process, or require manual input and correction of a particular failure for completion. Rather, the disclosed embodiments provide methods to conduct specific, customized testing that can efficiently diagnose system errors.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The foregoing Summary, as well as the following Detailed Description, is better understood when read in conjunction with the appended figures and drawings. In order to illustrate the present disclosure, various aspects of the disclosure are illustrated. However the disclosure is not limited to the specific aspects discussed herein. The following figures are included.

DETAILED DESCRIPTION OF ILLUSTRATIVE EMBODIMENTS

Figure 1:
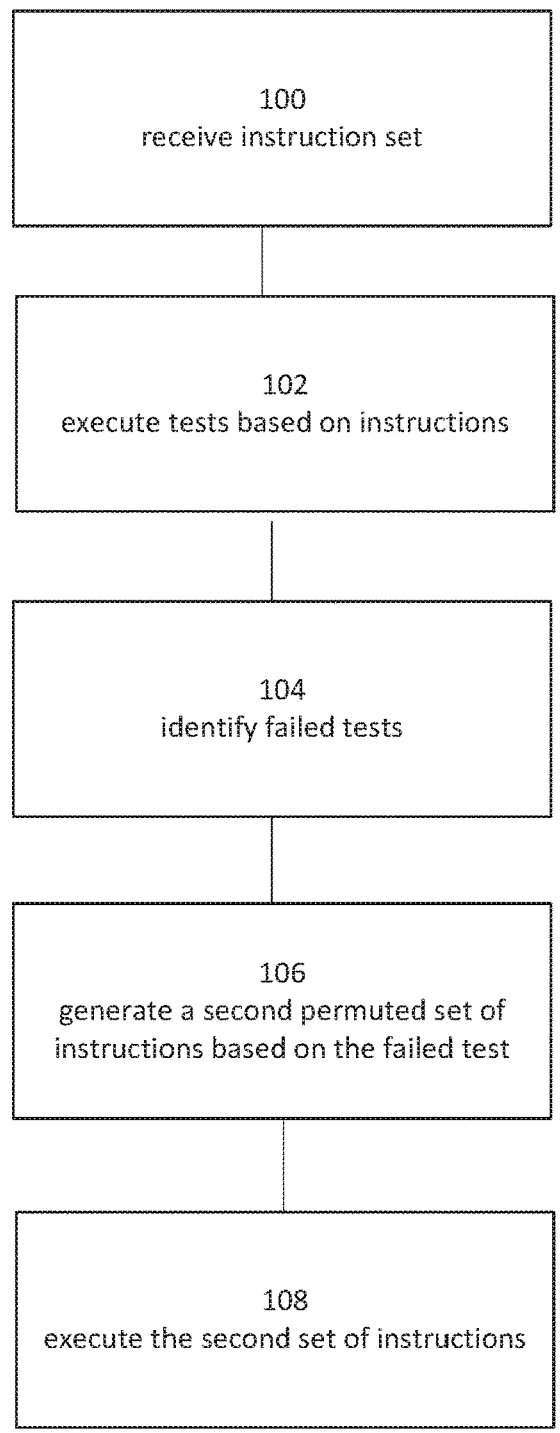
FIG. 1 illustrates an example of a process for data-driven test permutations

Systems and methods to conduct system-wide tests are disclosed herein. A testing process, sometimes known as integration testing, may involve testing of a variety of system components including a BIOS, operating system, device drivers, and the hardware components of a computing system. In many instances, these components may be provided by a number of different entities. For example, the operating system might be developed by one party, the BIOS by another, and each of the various device drivers by yet another entity.

Because of these factors, integration testing may be a difficult and time consuming process. It may be the case, for example, that a bug identified in one driver might impact a number of other components of the system. In conventional testing methods, the testing process might halt or require extensive manual intervention to be made to continue. It is also often difficult to coordinate the activities and diagnostic efforts of the various entities involved. For example, it might be helpful to a device driver vendor if a bug encountered in a driver could be easily reproduced. However, this is often difficult when a bug is discovered in integration testing, because (for example) the root cause of the bug might be another component whose operation is not directly related to that of the driver that encountered the bug.

In an embodiment, a set of instructions is provided. The instructions may comprise definitions of various testing operations. The instructions may further comprise associations between those tests and various conditions, assertions, and so forth which may indicate the results of a testing operation. These may be referred to as "checks." The instructions may further comprise associations between the tests, the checks, and various system components such as the BIOS, operating system, devices drivers, and so on. In some instances, the instructions may associate the tests and/or checks with subcomponents, such as a module within a BIOS, operating system, or driver.

In some embodiments, the set of instructions may comprise a sequence indicative of an order in which the tests should be performed. The instructions may also include information guiding other aspects of test execution, such as whether a depth-first or breadth first testing methodology should be employed. In some instances, the instructions may indicate actions to take upon encountered a failed check, such as halting testing, skipping to the next component, performing further testing, and so on.

The set of instructions may be executed and one or more issues identified. A classification of any issues may be performed. Some issues may be identified as inconsequential. Some issues may be identified as requiring all or a portion of the test to halt execution. For example, some failed checks might indicate that testing of a particular driver must be halted, while others might permit further testing.

After an initial execution, a permutation of the set of instructions may be formed based on the test results. As noted, certain checks may be indicative of testing paths that should be foreclosed in a second, permuted set of instructions. In some cases, a foreclosed path might be indicative of an alternate path. For example, a fault in driver operation might cause a set of broad diagnostic tests to be run in place of a routine set of tests.

In an embodiment, generation of permutations may be guided by parameters indicative of testing breadth and testing depth. These may be specified on a per-test basis, a per-component basis, per-module basis, and so on. In depth-oriented permutations, additional tests for a given component (e.g., a component that encountered a failure check) are added. In breadth-oriented permutations, failed tests may be eliminated in the permuted version to permit other tests to continue execution.

In some cases, the instructions may be permuted to focus on the identified issue. For example, the subset of tests leading up to a failed check may be identified and included in a permutation. The permuted set may then represent a means of reproducing the identified issue. In another embodiment, multiple permutations may be generated to comprise possible paths for reproducing an identified issue. For example, one permutation might include all tests that led to the issue, while a second permutation might include only a subset of tests. For example, tests involving unrelated drivers might be excluded, even if they were executed in the original set of tests that led to identifying the issue. Embodiments might then confirm that the reduced set of instructions leads to the same issue.

Permutations, such as those oriented towards reproducing identified issues, may be shared with other entities to allow those entities to reproduce the issue at their premises and/or using their own equipment.

In an embodiment, a set of instructions may include the following: information indicative of drivers and other software modules to be included in a permutation; information indicative of drivers and other software modules to be excluded in a permutation; information indicative of operating systems, virtual machines, and physical hardware to be included in a permutation; information indicative of operating systems, virtual machines, and physical hardware to be excluded from a permutation; information indicative of a verification level; information indicative of a degree to which the system is exercised, i.e. stressed, during testing, and other parameters that may be supplied to certain tests. Examples of these parameters include, but are not limited to, usernames, passwords, behavioral indications, and so forth.

In an embodiment, a set of instructions may include information indicative of a number of test cycles that may be run.

In an embodiment, a set of instructions may include information indicative of components (such as drivers) that should be excluded from loading or other operations. Conversely, the set of instructions might also include, in some instances, information indicative of components that should be loaded in each permutation.

In an embodiment, other parameters to control testing may be provided in the set of instructions. These may include indications of when or whether to reboot a computing device, reset hardware, delay execution of a test, and an amount of test verification to perform.

In an embodiment, the set of instructions may provide indications of which system components are involved in testing. These may include components directly subject to testing, components associated with testing, and components that are otherwise required or desired for testing to complete. The set of instructions may also provide, in some instances, a list of temporary inclusions or exclusions.

In an embodiment, the set of instructions may be associated with or comprise a configuration file that includes elements, such as those described above, in a format that may be queried to generate a derived set of instructions) may be generated. Thus, generating a new permuted set of instructions may, in some embodiments, comprise re-executing a query on the configuration file. In some cases, a same or similar query may be re-executed on the configuration file, subsequent to modifying the configuration file to include additional facts. For example, a device driver might be added to an exclude list in the configuration file subsequent to identifying an issue with that driver. Alternatively, in some cases executing a query on the configuration file might result in a number of additional tests being indicated, based on the same failure. Thus, in some embodiments execution of a query on the configuration file may produce a desired permutation of instructions.

FIG. 1 illustrates an example of a process for data-driven test permutations. At block 100, instructions associated with testing one or more modules, such as peripherals or devices, associated with the computing system are received. In an embodiment, a set of instructions defines modules associated with an operating system and parameters that may be used to control the execution of the tests. The instructions can define how exhaustively each module is tested, the order in which testing occurs, and how the results are analyzed.

In an embodiment, the instructions may be implemented as one or more configuration files. For example, a configuration file might, for example, be an XML file that provides data that may guide processes and methods for testing each of a plurality of modules associated with the computer operating system. The XML file might define parameters for executing tests and the modules (i.e. components such as BIOS, operating system, or drivers) on which the tests are performed, and so forth.

The instructions can be written in various formats, in order to specify the particular aspects of each module that testing should focus on, and define additional checks should certain outcomes occur. The instructions may further provide information indicative of forming subsequent permutations of the instructions.

Additionally, test failures may be defined by the configuration file, as well as instructions indicating how to identify them, and the subsequent steps, tests, and/or checks that may be taken.

In an embodiment, when the tests executed and a failure is identified, the configuration file is then permuted to bypass a point of failure. As described above, the breadth and depth of testing across various components can be adjusted, depending on the failed test and its associated module.

Permutations of tests can be automated to include coverage of a large number of drivers or other components. All embodiments disclosed herein are fully configurable, therefore enabling a range of test options and possibilities.

At block 102, a plurality of tests may be executed based on the instructions. When the instructions are executed, data pertaining to the execution of the tests is collected. The data may include testing paths taken, tests executed, results of testing, and so forth. Execution of a test may comprise simulating various conditions and executing additional "check" code to determine if the test may be deemed to have passed or failed.

At block 104, failed tests are identified and failed test may be logged. In some instances, this step is performed by human interaction. The system may comprise user interfaces, report generation tools, and the like to facilitate identification and recordation of issues. After issues have been identified and logged, the system may generate a second set of instructions based on the failed tests. This is depicted by block 106. The second set of instructions may be a permutation based on the first set of instructions. The permuted set of instructions may include or exclude tests based on an adjustment of the breadth and/or depth of the testing. This may depend on which tests failed, and indications which guide how the permutations are to be generated.

For example, if the first set of instructions to test the I/O of a peripheral camera failed, then the second set of instructions may be indicative of tests from the first set of instructions, except those relating to the camera. Conversely, the second set of instructions could specifically target the module associated with the failed test, and conduct additional checks and tests to analyze other aspects of the module.

At block 108, the second set of instructions is executed. The results of executing the tests according to the second set of instructions may then be processed. This may include identifying failed tests and outputting or logging information about the failure. This step may be followed by the generation of additional permuted versions of the test. Thus, the identification of additional failures can trigger the generation of another set of instructions, similar to how the second set of instructions were developed, in order to continue integration testing of all the operating system and its modules.

Figure 2:
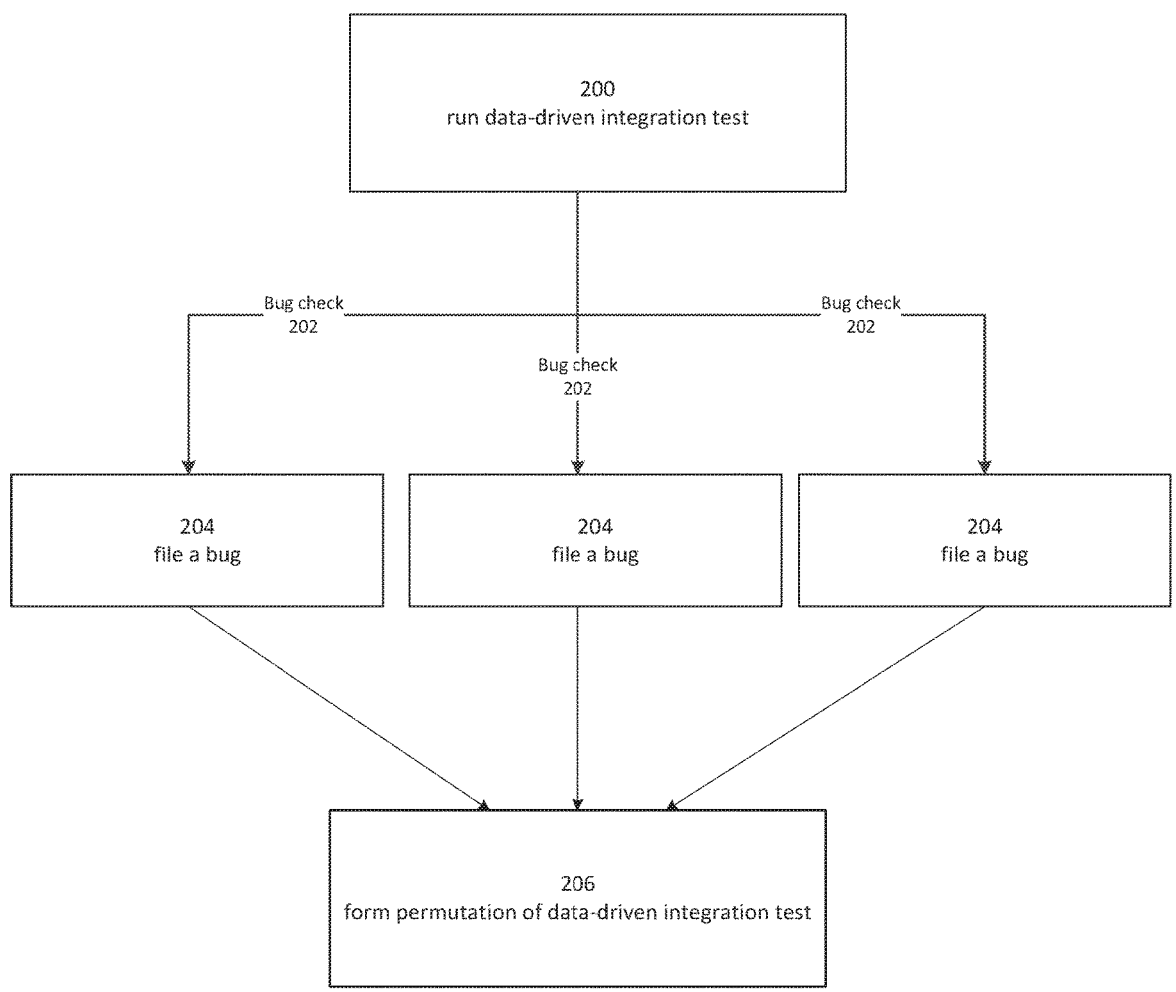
FIG. 2 illustrates a process for a system wide test.

FIG. 2 illustrates how the disclosed systems and methods may be applied to check for mistakes, errors, and/or failures in a program. These mistakes, errors, and/or failures are sometimes referred to as "bugs." In conventional testing methods, when a system test encounters a bug or other issue, the test is typically stopped and the issue noted. Typically, a solution to the bug or issue must be implemented and provided to the integration tester before the suite of tests can be executed past that point of failure. This serial process repeats each time an issue is encountered. As a result, this method of testing can be impractical and inefficient, especially when the bug fix requires manual input of instructions in order to correct.

In the disclosed process, however, system testing is enabled to run with increased parallelism, wherein multiple bugs can be identified without having to restart the testing process, or provide a solution to an issue before subsequent tests can be run.

In the example of FIG. 2, a data-driven integration test 200 is run, to perform a plurality of tests for bugs and other issues 202 related to modules associated with or attached to the system. When an issue is encountered, the system files the bug 204, notes the associated test, removes it from subsequent testing iterations and testing continues. The data from this round of tests, including data recorded in the filed bugs, may be used to form additional permutations of the tests 206. Unlike conventional methods, testing may continue a bug is found rather than stopping. The bug may be recorded and testing may continue. As discussed above, subsequent testing may be adjusted to test different aspects and/or modules of the system, in response to a test failure. With these methods, points of failure can be identified more efficiently, and system tests can be performed in a configurable, targeted manner.

In an embodiment, specific devices, drivers, verifiers, and so forth that are associated with identified bugs and issues can be excluded or adjusted in subsequent tests. The exclusions or adjustments may, for example, be based on test results and system stress levels. Conversely, all systems and components except the identified problem device, or module, can be filtered out, to better direct resources towards resolving identified issues. In some cases, reproduction-oriented permutations may scale downwards, to permit the permutation to execute on less capable hardware, while other permutations may scale upwards to increase stress on the system under test.

In another example, modified configuration files are communicated to third parties and other vendors to enable reproduction of failures identified during testing. These modified files may include logs of test results, including failures, and information about the tested modules and system status. Communicating these files allows parties to identify issues and failed tests on other systems, where the failed test may not have occurred. This feature provides an opportunity to proactively address potential issues on other systems, as well as observe patterns of testing outcomes across various computer systems and modules. Communication of modified configuration files also enables targeted, reproducible tests to be implemented. For example, a test suite can be implemented on a first system, then results indicating one or more issues can be identified and sent to vendors or developers, who can compile information, run subsequent tests run on other machines, and information can be collected.

Figure 3:
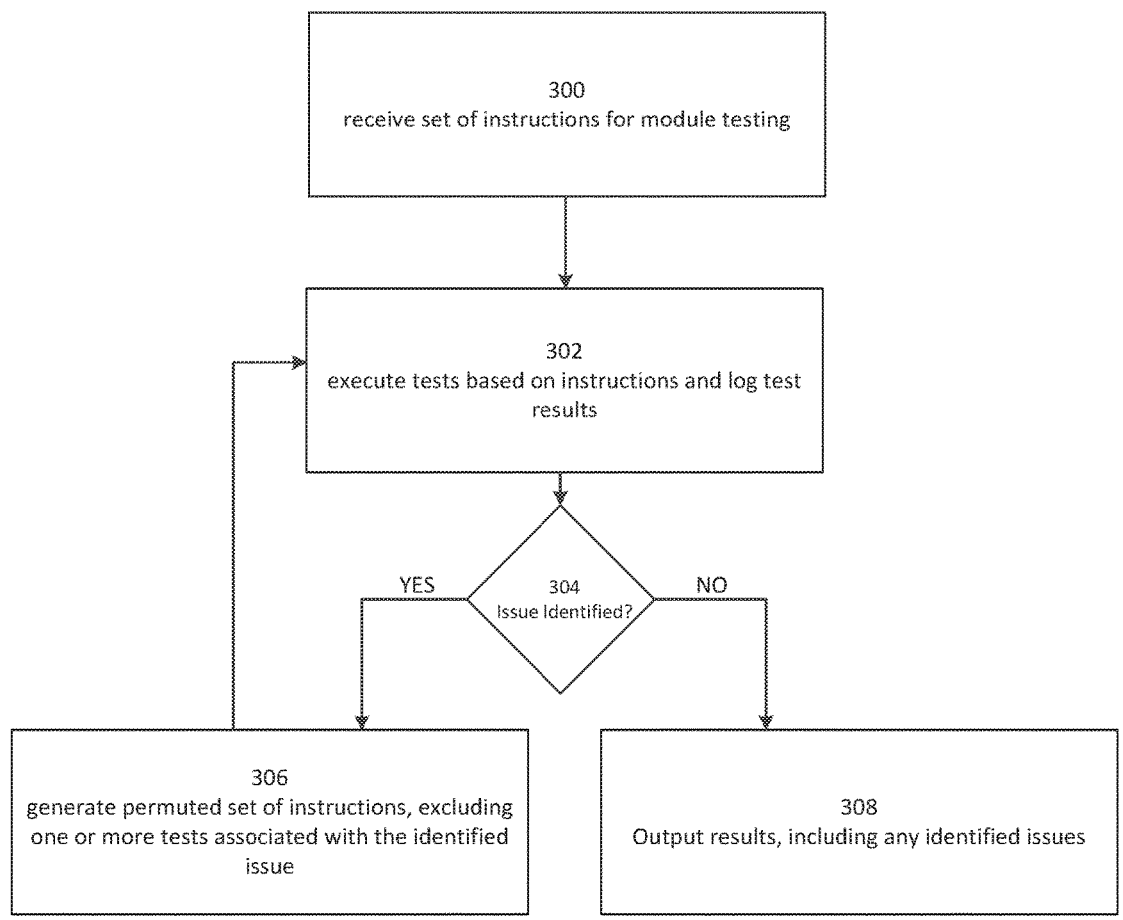
FIG. 3 illustrates an example testing procedure.

FIG. 3 illustrates a method which incorporates the described processes, and may be automated to improve efficiency. A computer system can receive instructions 300 through a configuration file, for example, to test a plurality of modules associated with the system. Each time a test is run, the results are logged 302, including any failed test. If an issue is identified, then a new set of instructions for testing modules is generated, which does not include the failed test. As noted above, these subsequent tests may be configured to target specific modules associated with the failed test, or exclude certain aspects, depending on the test results and the instructions in the configuration file. The new set of instructions is executed, the results are logged, and the process repeats until no issue is identified. When no issue is identified, the logged results and identified issues are output 308. The output results are also configurable, in that they can, for example, be limited to information about specific modules, tests, or other points of interest. The language, format, and information that the results provide, are defined in the initial configuration file. They can, for example, be displayed on a screen, recorded in an XML file, sent to other vendors, or used in subsequent tests and/or processes. However, the output results are not limited to these embodiments, and may communicate aspects of the testing process in various methods and formats, depending on the intended goals and purposes of the system-wide test.

Figure 4:
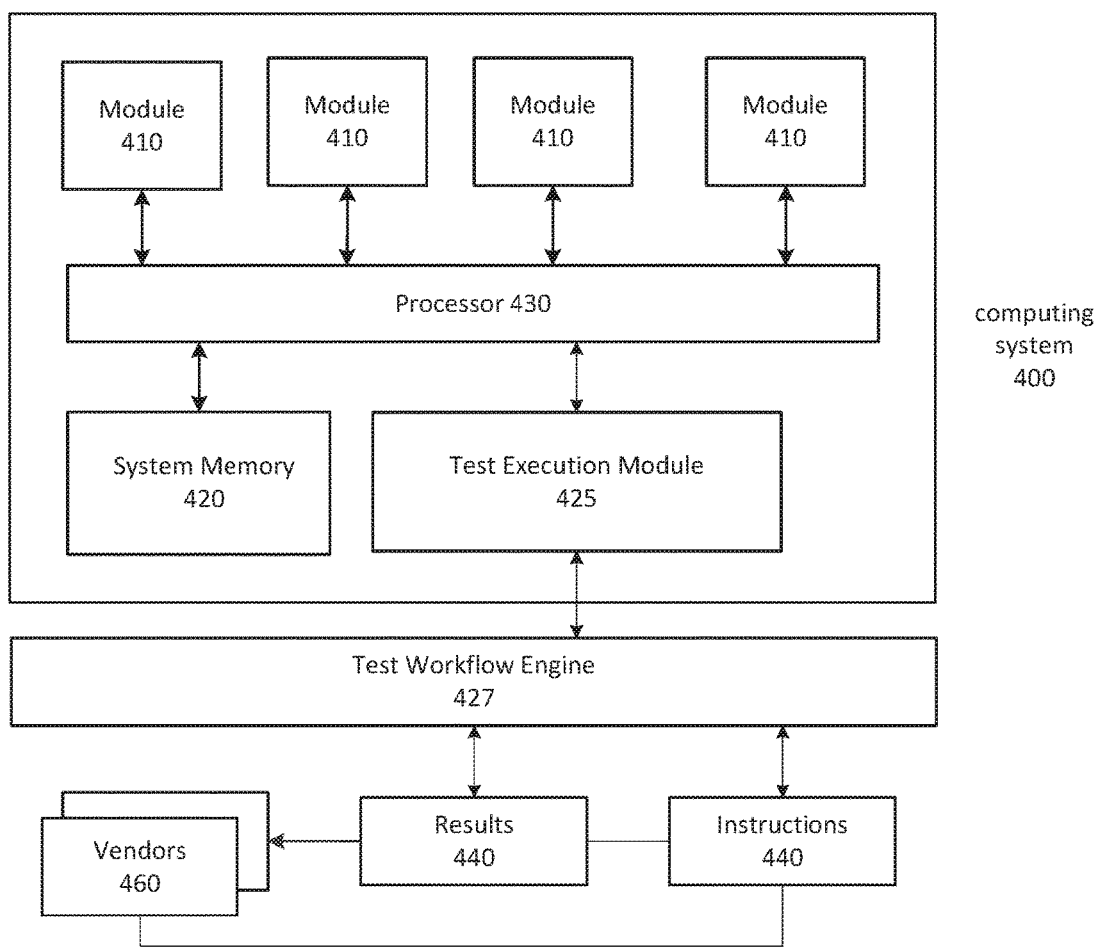
FIG. 4 illustrates an example system for conducting an integration test.

FIG. 4 illustrates an example system for conducting an integration test, with the features and methods described herein. A computing system 400 comprises a memory 420 and a processor 430, wherein the processor can receive instructions 440, which define a system wide integration test. The instructions 440 comprise a plurality of tests associated with one or more modules 410 that are associated with the system.

As previously described, the instructions, when executed, will generate a second set of instructions if and when a failed test occurs. The new set of instructions does not include the failed test, so as to allow the testing of one or more modules 410 to continue. Results of the system tests 440 recorded throughout the testing process, and can be output from the system in a variety of formats and methods. Results can be communicated to vendors 460 outside of the computer system 400, and subsequently used by third parties and additional processes.

In an embodiment, a system may be implemented comprising:

at least one processor; and at least one memory having stored thereon computer executable instructions that, when executed by the at least one processor, cause the system to:

receive a first set of instructions comprising information indicative of a first test of one or more modules;

cause execution the first test of the one or more modules;

receive information identifying a test condition associated with execution of the first test;

in response to the information, generate a second set of instructions based on the identified test condition, the second set of instructions indicative of a second test that is determined based at least in part on the identified test condition; and cause execution of the second test without resolution of the identified test condition.

In an embodiment, the second set of instructions is based on a permutation of the first set of instructions.

In an embodiment, the permutation excludes the first test.

In an embodiment, the permutation is associated with a module associated with the test condition.

In an embodiment, the second set of instructions includes a plurality of tests associated with the identified test condition.

In an embodiment, the first and second sets of instructions comprise one or more configuration files.

In an embodiment, the first and second set of instructions comprise an XML file.

In an embodiment, the second set of instructions comprises one or more tests associated with a module associated with the test condition.

In an embodiment, the second set of instructions excludes tests associated with a module associated with the test condition.

In an embodiment, the second set of instructions includes tests associated with a module associated with the test condition.

In an embodiment, a method of performing integration testing of a computing system may be implemented, the method comprising:

receiving, by a computing device, a first set of instructions defining a first plurality of tests, the first plurality of tests associated with testing a plurality of modules of a computer operating system using a test configuration;

executing the first plurality of tests based on the first set of instructions;

identifying, by the computing device, a test condition associated with executing a first test of the first plurality of tests, the test condition associated with a module of the plurality of modules;

generating, by the computing device, a second set of instructions based at least in part on the first set of instructions, the second set of instructions defining a second plurality of tests associated with the plurality of modules; and executing the second plurality of tests based on the second set of instructions without altering the test configuration.

In an embodiment, the second set of instructions excludes the first test.

In an embodiment, the second set of instructions includes the first test.

In an embodiment, the second set of instructions excludes a second test associated with the module, the second test selected based at least in part on the test condition.

In an embodiment, the second set of instructions includes a second test associated with the module, the second test selected based at least in part on the test condition.

In an embodiment, the second set of instructions is generated based at least in part on one or more parameters indicative of testing breadth and testing depth.

In an embodiment, the method further comprises identifying a minimized set of tests of the plurality of tests for reproducing the test condition.

In an embodiment, a computer-readable storage medium may be implemented, comprising computer-readable instructions that, when executed by a computing device comprising a processor and memory, cause the computing device to perform operations comprising:

receiving a first set of instructions defining a first plurality of tests, the first plurality of tests associated with testing a plurality of modules of a computer system in accordance with a test configuration;

executing the first plurality of tests based on the first set of instructions;

identifying a test condition associated with executing a first test of the first plurality of tests, the test condition associated with the plurality of modules;

generating a second set of instructions based at least in part on the first set of instructions, the second set of instructions defining a second plurality of tests associated with the plurality of modules; and executing the second plurality of tests based on the second set of instructions without resolving the test condition and without altering the test configuration.

In an embodiment, the second set of instructions excludes the first test.

In an embodiment, the computer-readable storage medium further comprises computer-readable instructions that, when executed by a computing device comprising a processor and memory, cause the computing device to perform operations comprising:

identifying a minimized set of tests for reproducing the test condition.

Figure 5:
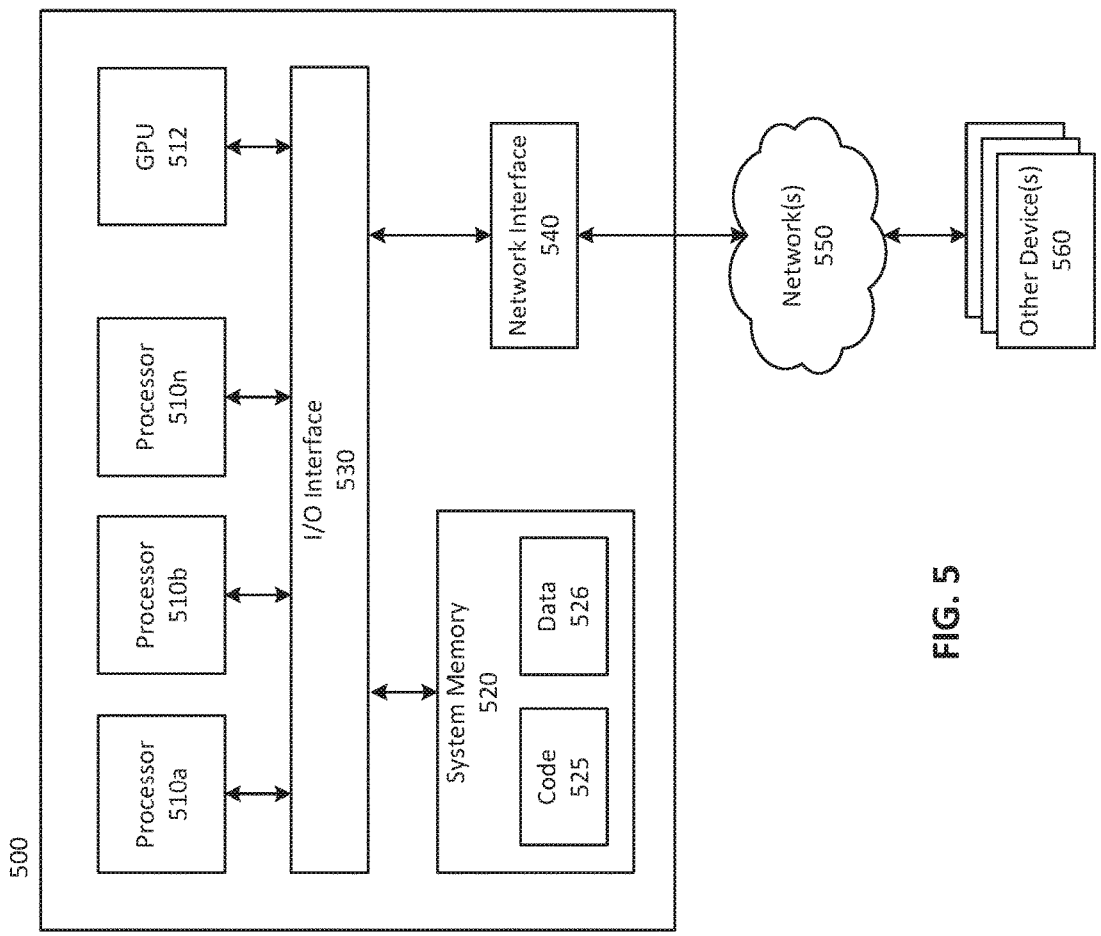
FIG. 5 illustrates an example diagram of a computing device that may be used in conjunction with the disclosed embodiments.

In at least some embodiments, as seen in FIG. 5, a computing device 500 implements a portion or all of one or more of the technologies described herein, including the techniques to implement the functionality of a system for integration testing may include a general-purpose computer system that includes or is configured to access one or more computer-accessible media. FIG. 5 illustrates such a general-purpose computing device 500. The general-purpose computing device 500 may be implemented as a mobile device, desktop computer, laptop, or any other type of computing device. Thus the various embodiments described herein may be implemented, for example, on a tablet executing an application. In some embodiments, some of the functionality may be implemented in the general-purpose computing device 500 and some functionality may be implemented in a remote computing device or computing environment, such as a cloud-based system.

In the illustrated embodiment, computing device 500 includes one or more processors 510a, 510b, and/or 510n (which may be referred herein singularly as "a processor 510" or in the plural as "the processors 510") coupled to a system memory 520 via an input/output (I/O) interface 530. Computing device 500 further includes a network interface 540 coupled to I/O interface 530.

In various embodiments, computing device 500 may be a uniprocessor system including one processor 510 or a multiprocessor system including several processors 510 (e.g., two, four, eight, or another suitable number). Processors 510 may be any suitable processors capable of executing instructions. For example, in various embodiments, processors 510 may be general-purpose or embedded processors implementing any of a variety of instruction set architectures (ISAs), such as the x86, PowerPC, SPARC, or MIPS ISAs, or any other suitable ISA. In multiprocessor systems, each of processors 510 may commonly, but not necessarily, implement the same ISA.

System memory 520 may be configured to store instructions and data accessible by processor(s) 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 520 as code 525 and data 526.

In one embodiment, I/O interface 530 may be configured to coordinate I/O traffic between processor 510, system memory 520, and any peripheral devices in the device, including network interface 540 or other peripheral interfaces. In some embodiments, I/O interface 530 may perform any necessary protocol, timing, or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510.

Network interface 540 may be configured to allow data to be exchanged between computing device 500 and other device or devices 560 attached to a network or network(s) 550, such as other computer systems or devices as illustrated in FIGS. 1 through 5, for example. In various embodiments, network interface 540 may support communication via any suitable wired or wireless general data networks, such as types of Ethernet networks, for example. Additionally, network interface 540 may support communication via telecommunications/telephony networks such as analog voice networks or digital fiber communications networks, via storage area networks such as Fibre Channel SANs or via any other suitable type of network and/or protocol.

In some embodiments, system memory 520 may be one embodiment of a computer-accessible medium configured to store program instructions and data as described above for FIGS. 1-4 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 500 via I/O interface 530. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 500 as system memory 520 or another type of memory. Further, a computer-accessible medium may include transmission media or signals such as electrical, electromagnetic or digital signals, conveyed via a communication medium such as a network and/or a wireless link, such as may be implemented via network interface 540. Portions or all of multiple computing devices, such as those illustrated in FIG. 5, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices. For purposes of this specification and the claims, the phrase "computer-readable storage medium" and variations thereof, does not include waves, signals, and/or other transitory and/or intangible communication media.

A number of different types of computing devices may be used singly or in combination to implement the resources of the service provider in different embodiments, including general-purpose or special-purpose computer servers, storage devices, network devices, and the like.

As used herein, the phrase "configured to" may encompass any way that any kind of structural component can be constructed to perform an identified operation. The structural component can be configured to perform an operation using software, hardware, firmware and the like, or any combinations thereof. The term "logic" may encompass any functionality for performing a task. For instance, each operation illustrated in the flowcharts corresponds to logic for performing that operation. An operation can be performed using software, hardware, firmware, physical electronic circuits, and the like, or any combinations thereof. The terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable device, or media.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

Figure 6:
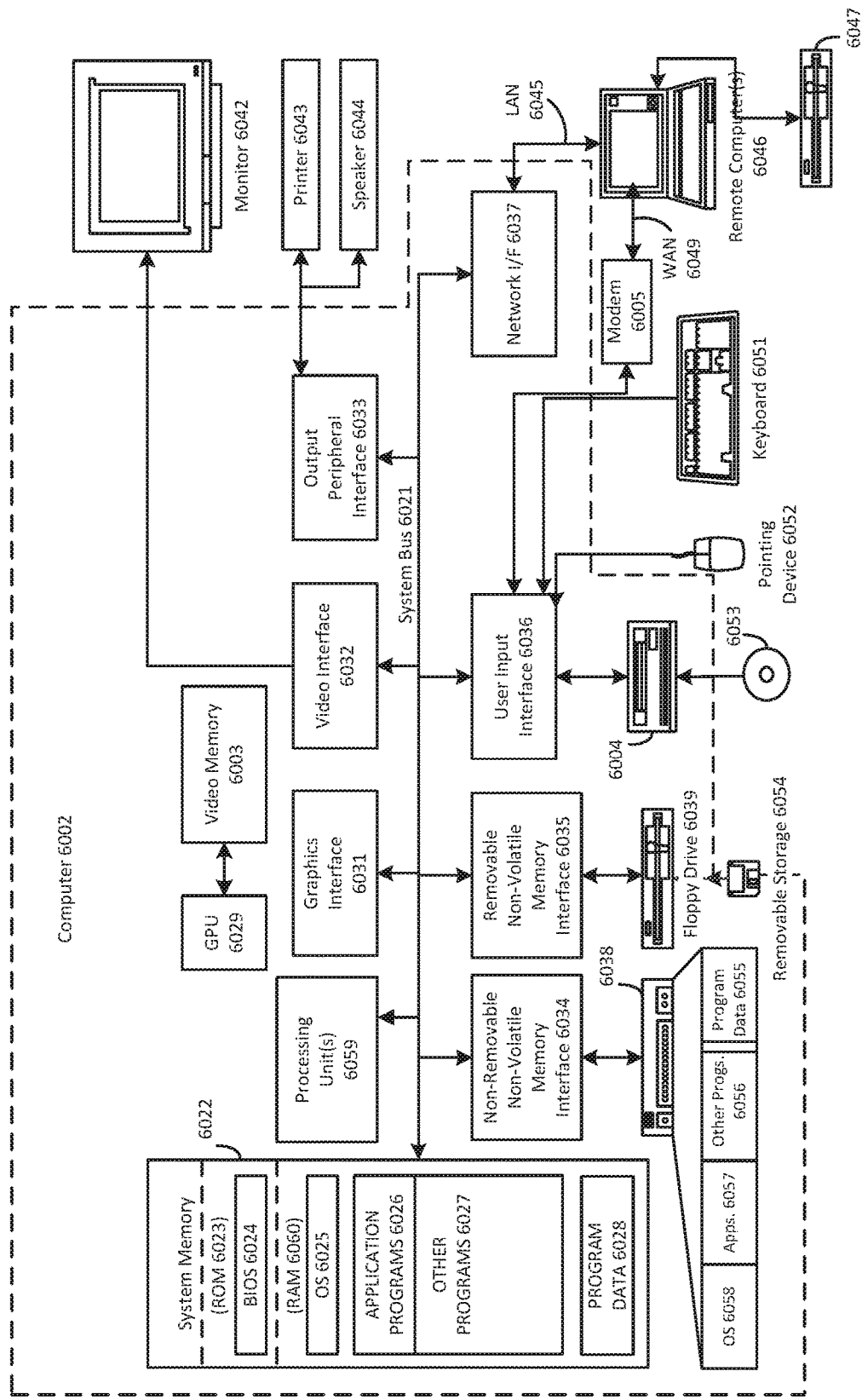
FIG. 6 depicts an example general purpose computing environment in which the techniques described herein may be embodied.

The techniques described above, may be implemented on one or more computing devices or environments, as described below. FIG. 6 depicts an example general purpose computing environment in which in which some of the techniques described herein may be embodied. The computing system environment 6002 is only one example of a suitable computing environment and is not intended to suggest any limitation as to the scope of use or functionality of the presently disclosed subject matter. Neither should the computing environment 6002 be interpreted as having any dependency or requirement relating to any one or combination of components illustrated in the example operating environment 6002. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit.

Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computer 6002, which may include any of a mobile device or smart phone, tablet, laptop, desktop computer, etc., typically includes a variety of computer-readable media. Computer-readable media can be any available media that can be accessed by computer 6002 and includes both volatile and nonvolatile media, removable and non-removable media. The system memory 6022 includes computer-readable storage media in the form of volatile and/or nonvolatile memory such as read only memory (ROM) 6023 and random access memory (RAM) 6060. A basic input/output system 6024 (BIOS), containing the basic routines that help to transfer information between elements within computer 6002, such as during start-up, is typically stored in ROM 6023. RAM 6060 typically contains data and/or program modules that are immediately accessible to and/or presently being operated on by processing unit 6059. By way of example, and not limitation, FIG. 6 illustrates operating system 6025, application programs 6026, other program modules 6027, and program data 6028.

The computer 6002 may also include other removable/non-removable, volatile/nonvolatile computer storage media. By way of example only, FIG. 6 illustrates a hard disk drive 6038 that reads from or writes to non-removable, nonvolatile magnetic media, a magnetic disk drive 6039 that reads from or writes to a removable, nonvolatile magnetic disk 6054, and an optical disk drive 6004 that reads from or writes to a removable, nonvolatile optical disk 6053 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 6038 is typically connected to the system bus 6021 through a non-removable memory interface such as interface 6034, and magnetic disk drive 6039 and optical disk drive 6004 are typically connected to the system bus 6021 by a removable memory interface, such as interface 6035.

The drives and their associated computer storage media discussed above and illustrated in FIG. 6, provide storage of computer-readable instructions, data structures, program modules and other data for the computer 6002. In FIG. 6, for example, hard disk drive 6038 is illustrated as storing operating system 6058, application programs 6057, other program modules 6056, and program data 6055. Note that these components can either be the same as or different from operating system 6025, application programs 6026, other program modules 6027, and program data 6028. Operating system 6058, application programs 6057, other program modules 6056, and program data 6055 are given different numbers here to illustrate that, at a minimum, they are different copies. A user may enter commands and information into the computer 6002 through input devices such as a keyboard 6051 and pointing device 6052, commonly referred to as a mouse, trackball or touch pad. Other input devices (not shown) may include a microphone, joystick, game pad, satellite dish, scanner, or the like. These and other input devices are often connected to the processing unit 6059 through a user input interface 6036 that is coupled to the system bus 6021, but may be connected by other interface and bus structures, such as a parallel port, game port or a universal serial bus (USB). A monitor 6042 or other type of display device is also connected to the system bus 6021 via an interface, such as a video interface 6032. In addition to the monitor, computers may also include other peripheral output devices such as speakers 6044 and printer 6043, such as a 3D printer, which may be connected through a output peripheral interface 6033.

The computer 6002 may operate in a networked environment using logical connections to one or more remote computers, such as a remote computer 6046. The remote computer 6046 may be a personal computer, a server, a router, a network PC, a peer device or other common network node, and typically includes many or all of the elements described above relative to the computer 6002, although only a memory storage device 6047 has been illustrated in FIG. 6. The logical connections depicted in FIG. 6 include a local area network (LAN) 6045 and a wide area network (WAN) 6049, but may also include other networks. Such networking environments are commonplace in offices, enterprise-wide computer networks, intranets and the Internet.

When used in a LAN networking environment, the computer 6002 is connected to the LAN 6045 through a network interface or adapter 6037. When used in a WAN networking environment, the computer 6002 typically includes a modem 6005 or other means for establishing communications over the WAN 6049, such as the Internet. The modem 6005, which may be internal or external, may be connected to the system bus 6021 via the user input interface 6036, or other appropriate mechanism. In a networked environment, program modules depicted relative to the computer 6002, or portions thereof, may be stored in the remote memory storage device. By way of example, and not limitation, FIG. 6 illustrates remote application programs 6048 as residing on memory device 6047. It will be appreciated that the network connections shown are example and other means of establishing a communications link between the computers may be used.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage. The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

The invention claimed is:

1. A system comprising:
at least one processor; and
at least one memory having stored thereon computer executable instructions that, when executed by the at least one processor, cause the system to:
receive a first set of instructions comprising information indicative of a first test of one or more modules;
cause execution the first test of the one or more modules;
receive information identifying a test condition associated with execution of the first test, the test condition associated with a test failure that interrupts execution of the first test or requires intervention before continuing execution of the first test;
in response to the information, generate a second set of instructions based on the identified test condition, the second set of instructions indicative of a second test that is determined based at least in part on the identified test condition and modified to bypass the test condition that is associated with the test failure; and
cause execution of the second test without resolution of the identified test condition.

2. The system of claim 1, wherein the second set of instructions is based on a permutation of the first set of instructions.

3. The system of claim 2, wherein the permutation excludes the first test.

4. The system of claim 2, wherein the permutation is associated with a module associated with the test condition.

5. The system of claim 1, wherein the second set of instructions includes a plurality of tests associated with the identified test condition.

6. The system of claim 1, wherein the first and second sets of instructions comprise one or more configuration files.

7. The system of claim 1, wherein the first and second sets of instructions comprise an XML file.

8. The system of claim 1, wherein the second set of instructions comprises one or more tests associated with a module associated with the test condition.

9. The system of claim 1, wherein the second set of instructions excludes tests associated with a module associated with the test condition.

10. The system of claim 1, wherein the second set of instructions includes tests associated with a module associated with the test condition.

11. A method of performing integration testing of a computing system, the method comprising:
receiving, by a computing device, a first set of instructions defining a first plurality of tests, the first plurality of tests associated with testing a plurality of modules of a computer operating system using a test configuration;
executing the first plurality of tests based on the first set of instructions;
identifying, by the computing device, a test condition associated with executing a first test of the first plurality of tests, the test condition associated with a module of the plurality of modules and associated with a test failure that prevents continued execution of the first test;
generating, by the computing device, a second set of instructions based at least in part on the first set of instructions, the second set of instructions defining a second plurality of tests associated with the plurality of modules and modified to bypass the test condition that is associated with the test failure; and
executing the second plurality of tests based on the second set of instructions without altering the test configuration.

12. The method of claim 11, wherein the second set of instructions excludes the first test.

13. The method of claim 11, wherein the second set of instructions includes the first test.

14. The method of claim 11, wherein the second set of instructions excludes a second test associated with the module associated with the test condition, the second test selected based at least in part on the test condition.

15. The method of claim 11, wherein the second set of instructions includes a second test associated with the module associated with the test condition, the second test selected based at least in part on the test condition.

16. The method of claim 11, wherein the second set of instructions is generated based at least in part on one or more parameters indicative of testing breadth and testing depth.

17. The method of claim 11, further comprising identifying a minimized set of tests of the plurality of tests for reproducing the test condition.

18. A computer-readable storage medium comprising computer-readable instructions that, when executed by a computing device comprising a processor and memory, cause the computing device to perform operations comprising:
receiving a first set of instructions defining a first plurality of tests, the first plurality of tests associated with testing a plurality of modules of a computer system in accordance with a test configuration;
executing the first plurality of tests based on the first set of instructions;
identifying a test condition associated with executing a first test of the first plurality of tests, the test condition associated with the plurality of modules and associated with a failure of the test condition;
generating a second set of instructions based at least in part on the first set of instructions, the second set of instructions defining a second plurality of tests associated with the plurality of modules and modified to bypass the failed test condition; and
executing the second plurality of tests based on the second set of instructions without resolving the test condition and without altering the test configuration.

19. The computer-readable storage medium of claim 18, wherein the second set of instructions excludes the first test.

20. The computer-readable storage medium of claim 18, further comprising computer-readable instructions that, when executed by a computing device comprising a processor and memory, cause the computing device to perform operations comprising:
identifying a minimized set of tests for reproducing the test condition.

* * * * *